June 20, 1933. P. SELÉNYI 1,914,534
FORMING ELECTRODE SURFACES
Filed Aug. 20, 1930

Inventor:
Paul Selényi
by Karlkrishaus
Atty.

Patented June 20, 1933

1,914,534

UNITED STATES PATENT OFFICE

PAUL SELÉNYI, OF BUDAPEST, HUNGARY, ASSIGNOR TO EGYESULT IZZOLAMPA ES VILLAMOSSAGI RT., OF UJPEST, HUNGARY, A CORPORATION OF HUNGARY

FORMING ELECTRODE SURFACES

Application filed August 20, 1930, Serial No. 476,622, and in Hungary and Austria August 28, 1929.

My invention relates to a method of forming electrode surfaces in electrical discharge devices such as electron tubes, photoelectric cells, incandescent lamps or the like and to the articles produced in accordance therewith. One of its objects is to provide means whereby the formation of electrode surfaces in devices of the kind described can be effected in a simpler and more efficient manner than was hitherto possible.

In such devices as a rule electrodes and quite particularly cathodes are used, the surface of which consists of a thin layer of metal oxide containing an absorbed metal and more especially an alkali or alkaline earth metal. The high efficiency of such cathodes is very likely caused by the fact that the so-called "electronic emission power" of an alkali or alkaline earth metal, which are electropositive, i. e. electron emissive, per se, is decreased if it is absorbed by a metal oxide, particularly its own oxide. Cathodes formed from these materials if used as hot cathodes have a high electron emission at relatively low temperatures.

If used as photoelectric cathodes in photocells or the like they have a considerable colour sensitivity even for light of greater wave length such as red and infra-red rays. If they are used as cold cathodes in discharge tubes filled with a gas of low pressure for instance in gaseous conduction lamps, they have a low cathode drop.

My invention is based on the fact that glass is rendered conductive by heating, so that if direct current is conducted across the glass, the alkaline metal and quite particularly the sodium contained in the glass is freed at the negative pole, oxygen at the positive pole. If direct current is conducted across the wall of a glass vessel, alkali metal or free oxygen may be produced within the vessel according to the direction of the current and the polarity of the electrode within the vessel.

It is well known in the art that the amount of alkali metal deposited within the vessel by means of such electrolytical current corresponds to Faraday's rule.

I have now found by tests that the amount of oxygen freed within the vessel also corresponds exactly to Faraday's rule. It is therefore possible to introduce a predetermined amount of oxygen into a closed and, if desired, evacuated vessel provided only that the wall of the vessel consists wholly or partly of glass or that the vessel is connected to a glass vessel.

Since glass is rendered conductive only at high temperatures, the glass vessel or a portion thereof must be heated in order to carry out the electrolytic process. According to a preferred embodiment of my invention the vessel is dipped in a suitable molten salt. In order to introduce oxygen into the vessel, the molten salt must be connected to the negative pole of a d. c. supply, so that it becomes the cathode of the electrolytic circuit. The anode of the circuit should be arranged within the glass vessel, for instance on the inner surface.

I have further discovered that advantageously the gas filling the tube and quite particularly gas under low pressure may be used as the anode in contact with the inner wall of the vessel, provided that the gas is rendered conductive by ionization for instance by means of an electric discharge caused and maintained in it. In order to maintain such a discharge, an electrode connected to a lead is arranged within the vessel and the positive pole of the direct current supply is connected to the lead. If the voltage of the direct current supply is sufficiently large, for instance several hundred volts, the electrolytic current itself will produce and maintain the gas electric discharge. A very low pressure of the gas filling the tube suffices to initiate the process since the oxygen freed by the current flowing through the glass gradually increases the gas pressure.

The gas discharge may for instance be initiated within an incandescent lamp evacuated, but not yet loaded with current, already at a voltage of 200 to 300 volt, the filament being used as anode and an electrode surrounding the bulb, for instance a body of molten salt as cathode. Once the discharge has been initiated, the oxygen gradually freed within the bulb will assist the gas discharge.

In order to control the intensity of the electrolytic direct current flowing through the glass independently of the discharge current dependent from the conductivity of the gas, two electrodes insulated from each other may be arranged within the bulb and a gas electric discharge may be maintained between said electrodes by means of direct or alternating current the positive pole of the electroylitic current being connected with one of said electrodes, the negative pole to the electrode applied to the outer surface of the bulb.

Instead of using a gas electric discharge for maintaining the ionization within the discharge vessel, outer means not connected to the walls of the vessel, may be used. For instance two annular electrodes may be arranged outside of the bulb and connected to a high frequency voltage supply or the entire vessel may be located within an electromagnetic high frequency alternating field. In order to carry out the electrolysis of the glass, an electrode extending into the gas filling the vessel is required also in these cases.

My invention is adapted in the first instance for use in connection with gas-filled discharge tubes, rectifiers with a hot or cold cathode, illuminating tubes, gas-filled photoelectric cells or the like, and quite especially for the formation of the cathode. My invention may be advantageously applied also in connection with vacuum tubes, but in this case the tube should be filled with gas at a suitable stage of the production process, for instance at the pump. The oxide layer of the cathode is then formed by means of oxygen electrolytically introduced into the tube and the gas filling is removed thereafter by the pump. The expenditure caused by the filling in and the removing of the gas is compensated for by the advantage that the oxide layer may be formed within the finished tube by means of an exactly controllable amount of oxygen.

Obviously the gas in the vessel, which is rendered conductive by ionisation, may be used in the electrolytic process not only as anode but also as cathode. In this case the metal cations (alkali or alkaline earth metals, particularly sodium) contained in the glass are freed within the tube. This step may be combined with the method disclosed above in order to produce oxide cathodes, i. e. cathodes the active material of which consists of alkali or alkaline earth metal and the efficiency of which is increased by means of a thin oxide layer deposited on the surface of the cathode.

In the drawing affixed to this specification and forming part thereof some discharge vessels embodying my invention are illustrated diagrammatically by way of example.

Figure 1:
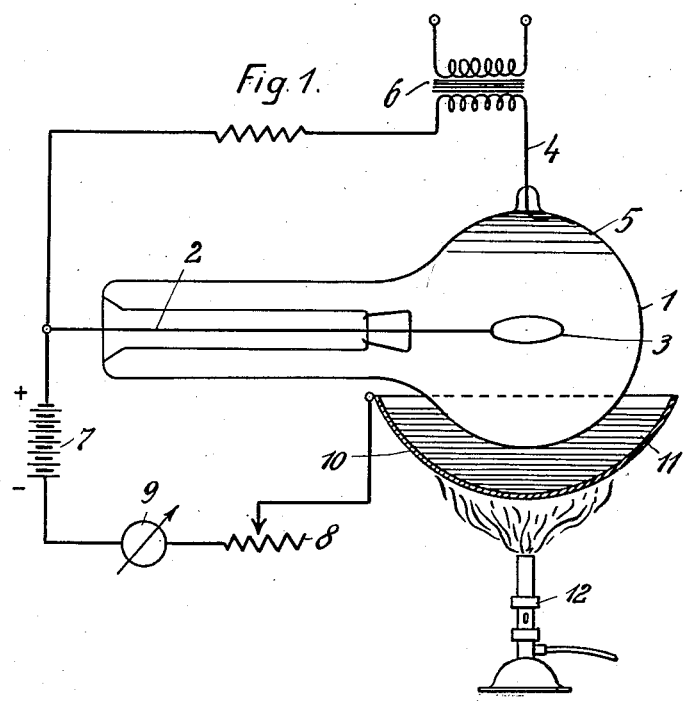
Fig. 1 is an elevation of a photo-electric cell and the means for carrying out the electrolytic process.

Referring firstly to Fig. 1, which shows the photo cell filled with gas of low pressure and sealed, 1 is the glass bulb containing two electrodes 3 and 5. The electrode 3 is a metal ring supplied with current by the lead 2. 4 is a lead of the electrode 5, which consists of an alkali or alkaline earth metal. According to the invention an electric glow discharge is maintained between the electrodes by means of a suitable current supply, for instance a transformer 6. 6' is a current limiting device such as a resistance or an inductance inserted in series between the secondary winding of the transformer 6 and the lead 2. 7 is a direct current supply, for instance a battery, supplying the electrolytic direct current. The positive pole of the battery is connected to the cell electrodes, while the negative pole is connected to a metal cup 10 by means of a resistor 8 and an ammeter 9. Molten salt 11, for instance molten sodium nitrate is contained within the cup 10. Heat is supplied to the melt by means of a Bunsen burner 12.

The operation of the device is as follows:

The portion of the bulb 1 submerged in the melt 11 is rendered conductive, while the gas filling is rendered conductive by means of the glow discharge between the electrodes 3 and 5. Therefore a direct current flows from the battery 7 through the metal ring 3, the gas space, the glass wall and the melt 11, the metal cup 10, the resistor 8 and the ammeter 9 back to the battery 7. Since the heated glass is an electrolytic conductor, the direct current carries the positive metal ions (sodium ions) contained in the glass to the cathode of the electrolytic current, i. e. to the melt 11, while oxygen is freed on the other side of the glass wall, i. e. within the vessel. The oxygen is fixed at once by the alkali or alkaline earth metal cathode, so that a uniform oxide layer is produced on the surface of the cathode.

Various modifications of this arrangement may be made without departing from the spirit of my invention. For instance the active cathode material, such as the alkali or alkaline earth metal, may be introduced into the vessel by means of glass electrolysis. In this case the procedure is as follows:

The anode 3 and the cathode lead 4 are secured in the bulb, which is then evacuated, filled with gas of the desired pressure and sealed. Now electrolysis of the glass is effected by means of the arrangement shown in Fig. 1, but with the positive pole of the battery connected to the metal cup 10 and the negative pole connected to the electrodes of the cell. Preferably the upper portion 5 of the bulb is cooled in order to obtain on this portion a deposition of the alkali or alkaline earth metal. When a sufficient amount of metal has been deposited on the upper portion of the bulb, the connections of the poles of the battery 7 are changed, so that the connection shown in Fig. 1 is established and the process is now continued, so that oxygen is freed within the bulb and an oxide layer is produced on the surface of the electrode 5.

Figure 2:
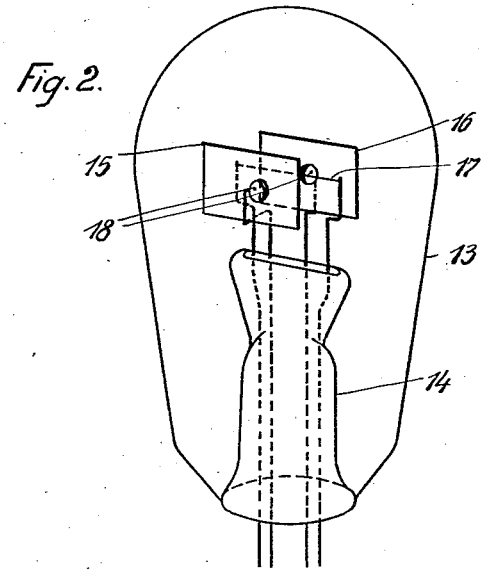
Fig. 2 is a similar view of a gas filled rectifier tube.

Referring now to Fig. 2, 13 is the sealed bulb of a rectifier tube. 14 is a socket supporting anode plates 15 and 16 and the heating filament 17 forming the core of the cathode and consisting of tungsten or the like. The active material of the cathode for instance barium, is preferably deposited on the filament by vaporization within the tube. In order to accomplish this, a pill 18 consisting of a chemical compound or a mixture containing the active material, for instance of a mixture of barium oxide and magnesium, is provided on the anode 15. Part of the bulb 13 is now dipped in a body of molten salt and oxygen is introduced into the bulb by means of an electrolytic process as described in connection with Fig. 1, a gas discharge being maintained between the anodes 15 and 16. The heating filament 17 is heated to sufficient temperature, so that an oxide layer is produced on the filament. By heating the anode 15 a layer of barium is deposited on the oxid layer of the filament. The sequence of these steps may be changed or the steps may be carried out simultaneously. The combined process described above—the electrolytical introduction of oxygen and of alkali or alkaline earth metal—may be used advantageously in this case also.

In the claim affixed to this specification the term "glass vessel" is intended to include also vessels consisting only partly of glass or consisting of some material other than glass, but communicating with a glass vessel.

Various changes may be made in the details disclosed in the foregoing specification without departing from the invention or sacrificing the advantages thereof.

I claim:—

The method of forming an electrode in a glass vessel comprising causing a flow of direct current across the wall of said vessel from the outside to form a metal layer by electrolytic decomposition of the glass and thereafter reversing the direction of said current to develop also by electrolytic decomposition of the glass oxygen and thereby partly oxidize said metal layer.

In testimony whereof I affix my signature.

PAUL SELÉNYI.